UNITED STATES PATENT OFFICE.

MARCUS LEVERN SLY, OF MEDINA, NEW YORK.

METHOD OF TREATING IRON SCRAP.

SPECIFICATION forming part of Letters Patent No. 695,177, dated March 11, 1902.

Application filed August 30, 1898. Serial No. 689,867. (No specimens.)

*To all whom it may concern:*

Be it known that I, MARCUS LEVERN SLY, a citizen of the United States, residing at Medina, in the county of Orleans and State of New York, have invented a new and useful Method of Treating Iron Scrap, of which the following is a specification.

This invention relates to a treatment of iron scrap, whereby the same is purified.

In carrying the present procedure into effect a compound is prepared composed of oxid of aluminium and oxid of iron in a powdered or finely-divided state, thoroughly and intimately mixed, and pound for pound in proportion. A plate of old sheet or scrap iron is then taken and laid flat upon the coke in a cupola, and upon this plate is placed a layer of the above-described compound, and upon the compound is placed a charge of fuel. Upon this charge of fuel is then imposed another sheet of iron, upon which is placed a layer of the compound and a charge of fuel, this alternate order of arrangement of the plates, the compound, and the fuel being maintained until the desired charge has been placed in the cupola. The fire and blast are then started and kept up until the entire mass is melted, after which it is drawn from the cupola in the usual manner. By this manner of treating the iron the same is purified in such manner that what would ordinarily be waste or scrap metal is converted into a product of high commercial value.

While the procedure is herein described as being carried out in connection with sheets of iron, it is to be understood that sheets of old or scrap steel may be similarly treated with the same advantageous results.

Having thus fully described my invention, what I claim as new, and desire to secure by Letters Patent, is—

The herein-described method of purifying iron scrap, which consists in placing in a cupola, sheets or plates of iron interposed by fuel and finely-divided oxid of iron and oxid of aluminium, and then subjecting the mass to the action of requisite heat, substantially as and for the purpose specified.

In testimony that I claim the foregoing as my own I have hereto affixed my signature in the presence of two witnesses.

MARCUS LEVERN SLY.

Witnesses:
J. N. HOOD,
GEO. H. SHATTUCK.